Dec. 20, 1966  G. SEULEN ETAL  3,293,086
METHOD OF HARDENING WORKPIECES
Filed May 11, 1964
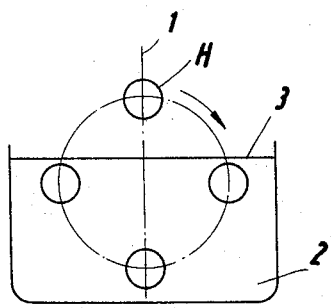
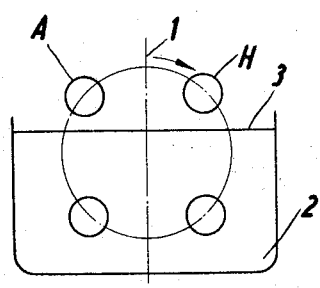
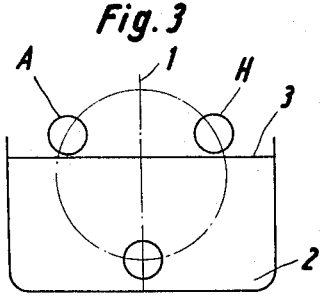
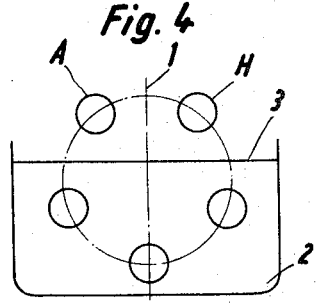
Inventors
Gerhard Seulen
Hermann Kuhlbars
By Cushman, Darby & Cushman
Attorneys United States Patent Office 3,293,086
Patented Dec. 20, 1966

3,293,086
METHOD OF HARDENING WORKPIECES
Gerhard Seulen, Remscheid, and Hermann Kuhlbars, Wuppertal-Elberfeld, Germany, assignors to Deutsche Edelstahlwerke Aktiengesellschaft, Krefeld, Germany, and Allgemeine Elektricitats-Gesellschaft, Berlin-Grunewald, Germany
Filed May 11, 1964, Ser. No. 366,312
Claims priority, application Germany, May 11, 1963, D 41,541
2 Claims. (Cl. 148—153)

The invention relates to a method of inductively heat treating, and particularly of inductively heating workpieces in the course of hardening them.

As known it is important, particularly in surface hardening treatments, to quench such workpieces as quickly as possible after their surface has reached the hardening temperature. Otherwise the temperature of the surface may fall below the required level again or the heat may penetrate too far into the workpiece before quenching takes place.

For ensuring that quenching can be effected without loss of time, several proposals have already been made. In principle these can be divided into two groups. In one group the procedure comprises quenching the workpieces inside the inductor immediately after they have been heated. Although this has the advantage that quenching can in fact take place without any delay, the place inside the inductor which should now be available for heating the following workpiece continues to be occupied until the quenching operation has been performed. This is a nuisance, especially if work is to proceed in continuous process. The second group of proposals therefore relates to the development of apparatus in which the workpieces are loaded into a rotary device which can be cyclically indexed.

The workpieces are thus conveyed to a heating station and kept therein for predetermined periods of residence to be quenched by then lowering them into a bath. If it is desired to harden, say the bearing surfaces of crankshafts, four similar crankshafts are loaded into the device. On the crankshaft which is at the heating station one or possibly several bearings are raised to hardening temperature. The device is then indexed and lowers this crankshaft into the quenching bath, simultaneously carrying the next crankshaft into the heating station. The corresponding bearing surfaces of this latter crankshaft are now heated, the device is indexed again, and so forth until all the crankshafts which have been loaded into the device have been treated in the same way. The device is then stopped, the treated crankshafts are removed and a fresh set of untreated crankshafts is loaded into the same. This replacement of crankshafts necessitates prolonged periods of stoppage during which no heat treatments take place. Naturally it would be desirable to operate the equipment without these periodical stoppages. More particularly it is desirable that the periods during which the rotary device must remain stationary, namely the periods during which the inductors are operative, should be utilized for unloading the treated work and for substituting untreated work.

According to the invention this problem is solved by stopping at least two of at least three loaded workpieces at points above the level of the surface of the bath so that one of them may be heated while the other or others which have already been quenched can be replaced by untreated work.

In such an arrangement it is essential that the heating-up times are exactly observed and particularly that they are never exceeded. This may be achieved by switching off the inductor at the appropriate time. However, if good and uniform hardening results are to be achieved, the heated work must then be lowered into the bath without further delay.

The time which is needed for replacing a quenched workpiece by an untreated workpiece can usually be programmed to synchronize with the required heating times. Nevertheless the manipulations required for unloading and loading are never free from accidental and unforeseen troubles. Obviously the continuity of operations is just as adversely affected by irregularities in the replacement of workpieces, such as may lead to a vacancy in the rotary device, as when the period of dwell in the heating station is unduly prolonged before quenching takes place. However, the present invention permits such contingencies to be met by providing for a workpiece to be quenched by being sprayed before it is actually lowered into the quenching bath whenever the period of stoppage is prolonged beyond the required period of heating as a result of delay in the completion of the workpiece exchange. Quenching by spraying is tantamount to partial quenching, the quenching operation proper being still performed in the actual bath. Moreover, it is proposed that a sprayer should be brought into operation only at times when owing to difficulties or mishaps the work at the unloading and loading station should not have been completed within the prescribed period of heating. The partial quenching is to be extended for a given period of time depending upon the size of the workpiece, but it should normally never exceed a time of 5 seconds.

Surprisingly it has been found that it is possible to proceed in the manner described without ill effects upon the quality of the hardened work. The time required for partial quenching should generally be sufficient to provide a safety period within which work at the unloading and loading station can be completed.

The method proposed by the present invention will now be more particularly described by reference to the accompanying schematic drawings.

The four diagrams represent a rotary device which may be of any detailed construction, and which is merely indicated by two dot-dash cross lines 1. The rotary device is located above a quenching bath 2 in such manner that its lower part dips into the bath.

FIG. 1 illustrates the method as performed in the past. Four workpieces are mounted in the rotary device 1, each workpiece being represented by a circle. These may be assumed in the present case and in the following description to be four crankshafts, the object being to harden the bearing surfaces of each crankshaft in succession. The rotary device 1 is indexed through angles of 90°. At H the workpiece is exposed to one or more inductors. As soon as the bearing surfaces of the crankshaft at this point have assumed the required temperature for hardening, the device is indexed 90° in the arrowed direction and thus immerses the heated workpiece in the bath by lowering it below the liquid level 3. This cycle is repeated until all four workpieces have been treated.

As already indicated either only one bearing surface may be treated when the rotary device is stopped or several bearing surfaces may be heated at the same time. When the treatment of all four workpieces has been completed they are unloaded and replaced by fresh workpieces that are to be treated. This process of replacement involves a prolonged period of stoppage during which no bearing surfaces can be hardened.

In contradistinction thereto the present invention proposes, as shown in FIG. 2, likewise to load say four workpieces into a rotary device and to index the rotary device through angles of 90° in the arrowed direction, but to index the rotary device in such a way that after each indexing step two workpieces will be located above the surface 3 of the quenching bath. The workpiece on the right at H is in course of being heated. During this period a treated workpiece is replaced by an untreated workpiece at the loading and unloading station at A. As soon as the heating time for the workpiece at H ends the rotary device 1 is indexed in the arrowed direction and carries the heated workpiece into the quenching bath. The fresh workpiece which has been loaded at A is simultaneously carried into the position marked H where it is similarly heated whilst a treated workpiece can be unloaded at A.

Since it is possible, particularly when the exchange of workpieces at A is manually performed, but even in cases in which this is automatically done, that trouble and delay may arise in performing the process of exchange, steps must be taken to prevent the period of residence at H from exceeding the predetermined heating up period. In other words, irrespectively as to whether the rotary device 1 is actually indexed at the proper indexing time or not, quenching must be effected immediately the prescribed period of heating is at an end.

The invention therefore provides a sprayer, not specially shown in the diagrams, which is arranged for instance to spray the workpiece directly from between the inductor windings which have just been switched off, in a manner already known in hardening and quenching devices of other types.

If the exchange of workpieces at A is manually performed it is advisable to provide push button control. This may take the form of providing means, such as relay and sequence control switches, for ensuring that the stopping period at A is limited to a specified time. If this time is exceeded before the workman at A pushes a button to indicate that the work of exchange has been completed, then the rotary device 1 is kept stationary for a further short period of time. During this period of delay the quenching sprayer at H is turned on. When the extension period has ended and the workman has meanwhile given the necessary signal, indicating that the work is completed, then the normal cycle of operations is resumed until a fresh contingency involving delay arises at A.

The arrangement may be such that the period of residence can exceed the prescribed heating period when there is delay in exchanging workpieces at A and steps taken to prevent there being a period of residence at H after heating has ended which would enlarge the time between the end of heating and the beginning of quenching. The workpiece can then be quenched by the spray. The workman may push the button before the end of the prescribed stopping period and allow indexing automatically to take place at the predetermined time, or if necessary can delay pushing the button and thus delay indexing until the workpiece has been properly heated and the spray applied.

Whereas in FIG. 2 the illustrated rotary device 1 is adapted for the reception of four workpieces, FIG. 3 shows a similar device for only three workpieces. The latter device is naturally indexed through angles of 120°.

In FIG. 4 the illustrated device is adapted for the reception of five workpieces and is accordingly indexed through angles of 72°. The principle of the procedures which take place at H and A is in all cases as already described by reference to FIG. 2.

It will be readily understood that by providing appropriate arrangements even more workpieces can be included in the cycle, provided always that at least two workpieces are at all times above the surface of the quenching bath.

What we claim is:

1. The method of hardening workpieces in which the workpieces are loaded onto a rotatable carrier, inductively heated and immersed in a quenching bath, which comprises the steps of periodically rotating the carrier to index it to a stop position in which at least two workpieces are located above the surface of the quenching bath while at least one further workpiece is in the bath, removing at least one hardened workpiece of those above the surface of the bath and replacing this by at least one unhardened workpiece at each stop position, inductively heating at least one unhardened workpiece of said workpieces above the surface of the bath for a prescribed time, and spraying the heated workpiece at least partially to quench it before it is indexed into the bath in the contingent event of the period required for effecting the said removal and replacement exceeding the prescribed period for heating.

2. Apparatus for hardening workpieces, comprising a rotatable carrier for the workpieces, inductor means for heating the workpieces, tank means for containing the quenching medium, means for indexing the carrier so that following each indexing movement at least two workpieces carried thereby may be located above a level of quenching medium in the tank while another or others is immersed in the medium so that at least one of said workpieces above the said level may be removed and replaced while another is being heated, means determining the operative period of the inductor means for each heating stage, means for determining the duration of each stop period of the carrier, sprayer means, and means operative so that if the removal and replacement period exceeds the said period of operation of the inductor means, the duration of the stop period may be prolonged and said sprayer means deliver quenching medium to the heated workpiece before it enters the quenching medium.

References Cited by the Examiner
UNITED STATES PATENTS

| | | | |
|---|---|---|---|
| 2,787,566 | 5/1957 | Seulen et al. | 148—146 |
| 3,240,480 | 3/1966 | Cary | 266—4 |

HYLAND BIZOT, *Primary Examiner.*

DAVID L. RECK, C. N. LOVELL, *Assistant Examiners.*